United States Patent
Powers

(10) Patent No.: US 9,697,413 B2
(45) Date of Patent: Jul. 4, 2017

(54) SYSTEM AND METHOD FOR COMPRESSING ELECTRONIC SIGNATURES

(71) Applicant: Scriptel Corporation, Columbus, OH (US)

(72) Inventor: John G. Powers, Ontario, NY (US)

(73) Assignee: Scriptel Corporation, Columbus, OH (US)

( * ) Notice: Subject to any disclaimer, the term of this patent is extended or adjusted under 35 U.S.C. 154(b) by 313 days.

(21) Appl. No.: 14/461,835

(22) Filed: Aug. 18, 2014

(65) Prior Publication Data

US 2016/0048719 A1 Feb. 18, 2016

(51) Int. Cl.
*G06K 9/00* (2006.01)
*G06K 9/22* (2006.01)

(52) U.S. Cl.
CPC ......... *G06K 9/00154* (2013.01); *G06K 9/222* (2013.01)

(58) Field of Classification Search
CPC ............................ G06K 9/222; G06K 9/00154
See application file for complete search history.

(56) References Cited

U.S. PATENT DOCUMENTS

| | | | |
|---|---|---|---|
| 4,678,869 A | 7/1987 | Kable | |
| 5,544,255 A | 8/1996 | Smithies et al. | |
| 5,892,824 A | 4/1999 | Beatson et al. | |
| 6,519,052 B1* | 2/2003 | Oneda | G06T 9/00 358/1.12 |
| 6,694,045 B2* | 2/2004 | Chung | G06K 7/10346 345/179 |
| 7,058,735 B2* | 6/2006 | Spencer | G06F 13/28 710/22 |
| 2003/0004750 A1 | 1/2003 | Teraoka et al. | |
| 2008/0296370 A1* | 12/2008 | Khandelwal | G06Q 30/02 235/380 |
| 2010/0333194 A1* | 12/2010 | Ricordi | G06F 17/30943 726/17 |
| 2011/0179289 A1* | 7/2011 | Guenther | G06F 21/32 713/189 |
| 2011/0185184 A1 | 7/2011 | Guenther | |
| 2012/0331546 A1* | 12/2012 | Falkenburg | G06F 3/03545 726/16 |
| 2013/0063745 A1* | 3/2013 | Tecu | H04N 1/00392 358/1.13 |

(Continued)

FOREIGN PATENT DOCUMENTS

WO 0002149 A1 1/2000

OTHER PUBLICATIONS

International Search Report, Patent Cooperation Treaty Application No. PCT/US2013/026920, Jan. 24, 2014.

*Primary Examiner* — Gregory M Desire
(74) *Attorney, Agent, or Firm* — Barclay Damon, LLP

(57) ABSTRACT

A remote data capture system includes a host computing device. A client computing device is communicatively coupled to the host computing device. A capture device having a sensor is coupled to the client computing device. The capture device is configured to receive an electrical input signal from the sensor, convert the input signal to corresponding input data having a predetermined format, compress the input data to a variable-length bit stream, and convert the bit stream to keyboard codes. The client computing device selectably transmits the keyboard codes to the host computing device.

12 Claims, 3 Drawing Sheets

(56) References Cited

U.S. PATENT DOCUMENTS

| | | | |
|---|---|---|---|
| 2013/0215078 A1 | 8/2013 | Bodnar et al. | |
| 2013/0297488 A1* | 11/2013 | Boyanov | G06Q 40/025 705/38 |
| 2014/0149281 A1* | 5/2014 | Shvarts | G06Q 50/18 705/39 |
| 2016/0048719 A1* | 2/2016 | Powers | G06K 9/222 382/189 |

* cited by examiner

SYSTEM AND METHOD FOR COMPRESSING ELECTRONIC SIGNATURES

FIELD

The present invention relates generally to the generation of electronic signatures, in particular to compressing electronic signatures.

BACKGROUND

Systems that provide for the collection of handwritten signatures on electronically delivered documents are in common use. A sensor panel, such as a resistive or capacitive type, is provided for a signer. When the sensor panel is traversed by a stylus in a handwriting transaction, the sensor panel outputs X-Y coordinate data derived from a voltage gradient on the panel corresponding to the handwritten signature scribed thereon. A controller utilizes the X-Y coordinate data from the stylus to record the location of the stylus on the sensor panel at regular intervals as digital signature data. The signature data contains the path of the pen as a progression of coordinate sets that, when charted, provides a virtual map of the signature.

The coordinate-set information of the digitized signature data may then be further processed. For example, signature devices that employ a Universal Serial Bus (USB) interface may be configured to transmit signature data as X-Y coordinates through proprietary or standard USB Human Interface Device (HID) "reports" or "packets," i.e., data having a predetermined structure so that a host device may be configured accordingly to receive the data.

Some signature-capture devices are configured to generate and transmit signatures as rasterized images. The images are compressed using one or more raster compression techniques common to the format of the raster chosen. An advantage of raster images is that many formats are ubiquitous and relatively easy to work with because there are many tools available in the art to encode and decode them. However, a disadvantage of raster images of signatures is that, even when compressed, they tend to require relatively large electronic files because they describe a plethora of pixels rather than the relatively small number of vectors required to describe the strokes of a signature. In addition, raster images do not scale well; scaling up causes signatures to become pixilated and thus poor-quality, while scaling down irreversibly removes data from the signature. Yet another disadvantage of raster signatures is that there is no timing information, which is desirable for forensic analysis. Another concern is that digitized signatures often must be stored in electronic databases. Due to their relatively large file size, storing raster images is not desirable since a correspondingly large amount of storage capacity must be provided.

Given the shortcomings of raster images it is desirable to transmit signatures over a USB keyboard interface, and to do so efficiently. U.S. patent application Ser. No. 13/771,843, filed Feb. 20, 2013 and incorporated by reference herein, is commonly owned by the applicant of the present invention and discloses a system configured to encode signature data as a series of keystrokes that can be interpreted by a host. One drawback of this arrangement is that computer operating systems such as Windows, OSX, and Linux poll the keyboard on a regular basis. Consequently, the amount of keystrokes that can be transmitted is limited by the poll rate of the operating system. When the operating system polls the keyboard and finds keystrokes it places them into a buffer. The buffer is emptied asynchronously. It is therefore possible for the buffer to overflow, resulting in undesirable data loss.

Another problem with USB keyboard interfaces is that after the signature is received by the host computer it is sometimes necessary to transmit that signature over a relatively slow interface, such as a 2400 baud modem. If the signature data includes a large number of keystrokes the amount of time required to transmit the message may be unacceptable. In addition, if buffers are utilized they may overflow, resulting in unacceptable loss of data.

SUMMARY

A system for generating electronic signatures as keyboard keystrokes is disclosed according to an embodiment of the present invention. The system is further configured to compress signature vector data and transmit it across a keyboard interface. A modified Huffman compression arrangement is utilized to compress the encoded data. The compressed signature data requires less time to transmit than uncompressed signature data, a particular advantage when relatively slow communications systems are used to transmit the data. The compressed data also reduces the risk data loss due to overflowed buffers.

One aspect of the present invention is a remote data capture system. The system includes a host computing device. A client computing device is communicatively coupled to the host computing device. A capture device having a sensor is coupled to the client computing device. The capture device is configured to receive an electrical input signal from the sensor, convert the input signal to corresponding input data having a predetermined format, compress the input data to a variable-length bit stream, and convert the bit stream to keyboard codes. The client computing device selectably transmits the keyboard codes to the host computing device.

Another aspect of the present invention is a method for compressing electronic signatures. The method includes the steps of generating an electrical input signal in response to movement of a stylus upon a sensor panel, measuring coordinates corresponding to the electrical input signal, scaling the coordinates, differencing the scaled coordinates, encoding the differenced coordinates with special codes to generate coded data, compressing the coded data, and encoding the compressed data into a predetermined format. In one embodiment the coded data is compressed using a modified Huffman compression arrangement.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
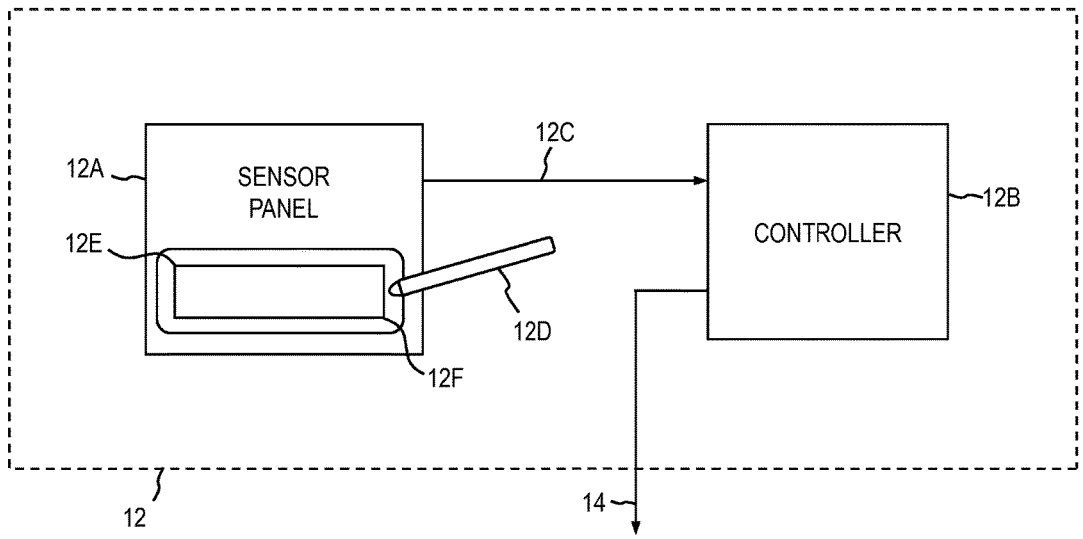
FIG. 1 is a schematic block diagram of a signature capture device according to an embodiment of the present invention.
Figure 2:
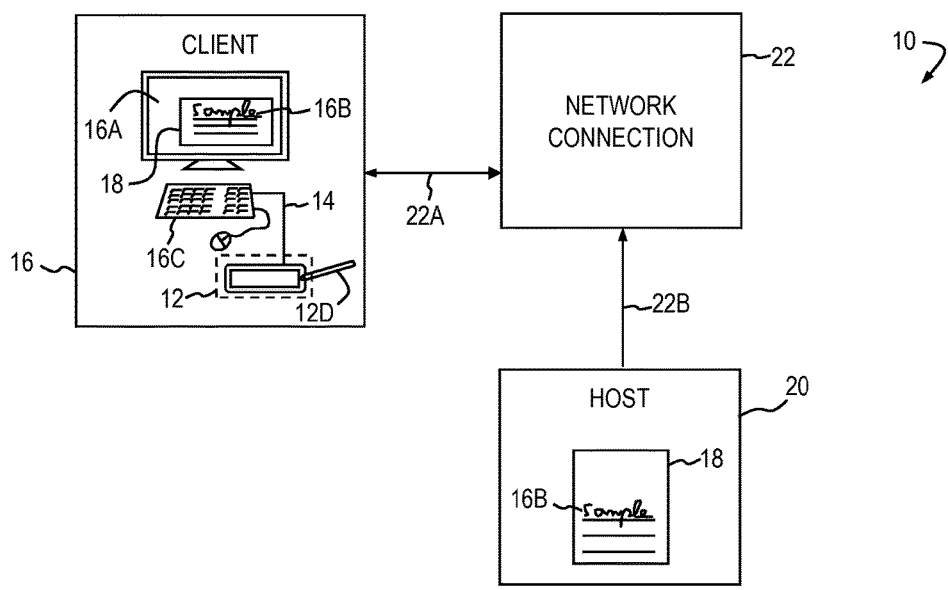
FIG. 2 is a schematic block diagram depicting a remote signature capture system and method in accordance with an embodiment of the disclosed invention.

Referring to FIGS. 1 and 2, a remote data capture system and process 10 is shown according to an embodiment of the present invention. A stylus-based signature capture device 12 is shown and comprises a sensor panel 12A and an associated controller 12B interconnected via an electrical connection 12C. A stylus 12D may be used to "write" signatures upon sensor panel 12A. Controller 12B converts electrical input signals generated by sensor panel 12A in response to the movement of stylus 12 thereupon to corresponding input data having a predetermined format, such as keystrokes emulating a USB keyboard. An electronic interface 14 is utilized to communicatively couple signature capture device 12 to a client computer 16.

Sensor panel 12A may be of a capacitive, resistive or other suitable construction. Firmware or software is provided within signature capture device 12 on controller 12B and provides the intelligence to convert movements of stylus 12D upon the face of sensor panel 12A into data corresponding to the trace of the stylus, i.e., a handwritten signature. In addition to converting stylus 12D movements into handwriting signature data, predetermined electronic hardware, software, firmware or a combination thereof associated with controller 12B may utilize a pre-defined "encoding key" to convert the handwriting signature data into a series of key codes/scan codes emulating, for example, those output from a standard computer keyboard, as at 16C of client computer 16.

In practice, a document 18 residing on or accessible by a host computer 20, needing to be signed with a handwritten signature of a party is delivered by the host computer to client computer 16 via an electronic communication system 22, such as a wired and/or wireless electronic network, an internet connection, a modem or other communications methodology. A first communication connection 22A is made to client computer 16, while a second communication connection 22B is made to host computer 20. A network, such as the internet or any of the other previously-mentioned communication systems, may be intermediate communication connections 22A, 22B to facilitate communication between client computer 16 and host computer 20. Preferably, electronic communication system 22 is bidirectional to facilitate bidirectional communication between client 16 and host 20.

Once document 18 is presented to the client computer 16 for signature, a signature block 16B for an electronic document or record may be presented on the client computer screen 16A. A user at the client computer 16 positions a cursor on the signature line of the document within the document window 16B and then scribes a handwritten signature onto the sensor panel 12A of signature capture device 12. As the signature is scribed, corresponding signature data is generated and processed by the encoding key, which generates a key code/scan code data stream which the client computer translates into a string of ASCII or Unicode characters. The document 18 to be signed, which appears on computer screen 16A, is provided with a "decoding key" corresponding to the encoding key that was used to create the encoded character string either embedded within it or in a separate, but related, data file. A graphic representation of the signature appears within the signature block 16B on the client computer. Signature capture device 12 is coupled to the processing component of the client computer via a standard interface, such as through a "USB" port which may be directly connected to the computer (not shown) or to an interfacing connector on keyboard 16C, as shown in FIG. 2, which is in turn coupled to the computer. In this manner, signature capture device 12 essentially emulates the characteristics of a standard computer keyboard, and appears electronically to be a standard keyboard, as far as the rest of the system 10 components are concerned.

Although previously described as hardware, suitable portions of system 10 may be provided as software or firmware that reroute the data once it has been input into a computer, typically through a data interface such as a "COM" port. The input data is routed to a keyboard buffer by the software, making it appear as if it entered system 10 through the keyboard. Components such as keyboard wedges can be used simultaneously with keyboards.

Once the user enters a signature via signature capture device 12, it may be verified by reviewing the signature window 16B on client computer screen 16A. In the alternative or as a redundancy, the signature can also appear and be verified via the sensor panel 12A. Upon verification that the signature is legible and of sufficient quality, the signature and the electronic document to which it was attached may be "cast" and then selectably released to the host computer 20. For purposes of this disclosure, the term "cast" means that the document and all signatures applied thereto becomes fixed in time by applying an embedded digital stamp or timing fingerprint signature that would enable verification of its integrity. In the alternative, the signature entered onto the signature capture apparatus 12 may simultaneously appear on the screen of the host computer 20. However, in this case, it may well be desirable to maintain the signature as a transient until it is finally cast in the document by the user.

Once the document has been cast with a handwritten signature it may be selectably printed remotely, transmitted electronically or stored for future access by appropriate parties.

Figure 3:
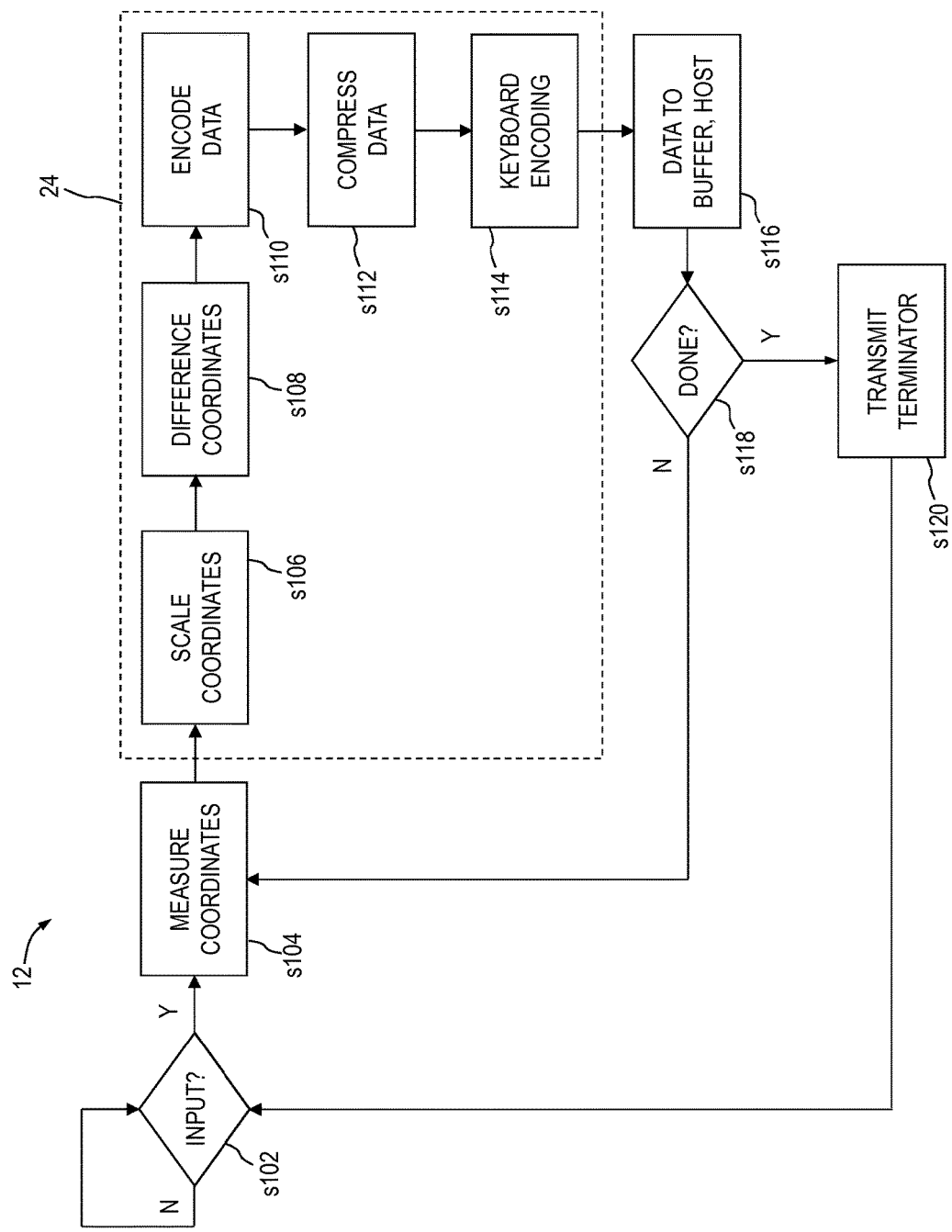
FIG. 3 is a flow diagram showing signature data capture and compression.
Figure 4:
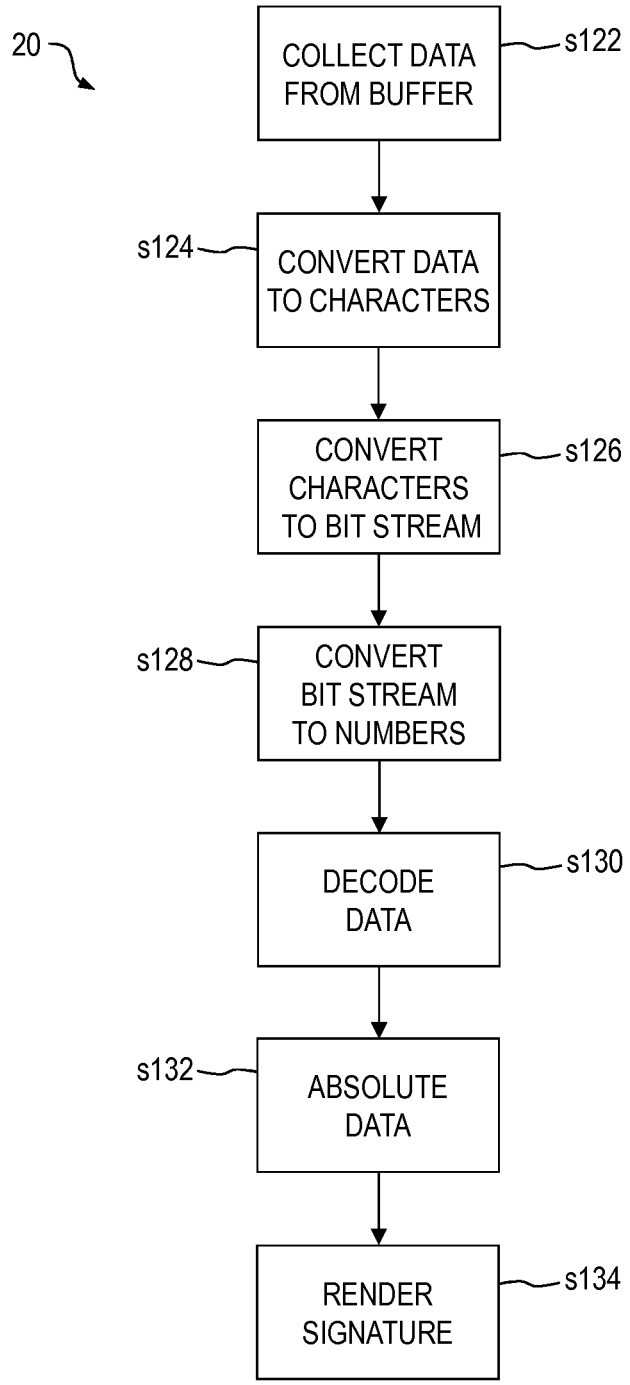
FIG. 4 is a flow diagram showing decompression of the compressed signature data of FIG. 3.

With continued reference to FIGS. 1 and 2, details of the operation of system 10 with respect to compressing signature data are shown in FIGS. 3 and 4 according to an embodiment of the present invention. At s102 system 10 monitors for an input to sensor panel 12A. When a user begins signing via sensor panel 12A, the signature capture device 12 computes at s104 data comprising coordinates corresponding to the location point of stylus 12D with respect to the sensor panel at regular time intervals. The location point data is provided to a compressor 24 residing in signature capture device 12, client computer 16 or any other suitable portion of system 10.

The first processing stage of compressor 24 is a scaling operation s106 wherein each quantified coordinate location point's value is divided by a constant. Scaling reduces the elements of the coordinate to the minimum required. For example, signature capture device may be capable of producing 16-bit coordinate elements (i.e., X and Y coordinates ranging from 0 to 65535), but the more values that can be encoded, the bigger the resulting data bit stream will be. Accordingly, coordinate elements are preferably scaled down to the minimum required in order to reduce data transmission sizes. In some embodiments of the present invention coordinate data represented by sensor panel 12A is scaled to pairs of X-Y coordinates in the range of 0 to 505. For example, with reference to FIG. 1 an upper left corner 12E of sensor panel 12A may be represented by X-Y coordinates 0,0 and a lower right corner 12F of the sensor panel by 505,505.

The next processing stage of compressor 24 is a "differencing" operation s108. At s108 a vector is formed from scaled coordinates s108 by subtracting the previous point from the current point. Stated another way, differencing is the process of finding the difference between each successive coordinate element, keeping X's and Y's separate. The initial difference is from the origin so that the first difference is the coordinate itself. In other words, $$\Delta_{x1}=X_1 \qquad \text{Equation 1}$$

$$\Delta_2=Y_1 \qquad \text{Equation 2}$$

$$\Delta_{x2}=X_2-X_1 \qquad \text{Equation 3}$$

$$\Delta_{y2}=Y_2-Y_1 \qquad \text{Equation 4}$$

$$\Delta_{x3}=X_3-X_2 \qquad \text{Equation 5}$$

$$\Delta_{y3}=Y_3-Y_2 \ldots \qquad \text{Equation 6}$$

and so on. Stated another way, s108 generates the value current X−previous X and current Y−previous Y.

Data compression is most effective when the data is at least partially repetitive. In order to repeat data as often as possible, rather than using absolute coordinates, relative coordinates are preferably used. When starting a new signature the first coordinate is relative to 0,0. Coordinate $n_0$ is relative to $n_{-1}$. This means that relative coordinates may be negative or positive, for example, in the range of −505 to 505 in the scaling arrangement described above.

If the signature of s102 is drawn as a generally straight line at a relatively constant speed, rather than obtaining X-Y coordinates at s104 such as (5,5) (10,10) (15, 15) (20, 20), etc. system 10 will generate at s108 coordinates such as (5,5) (5,5) (5,5) (5,5). As can be seen, this data is repetitive and thus is more easily compressed. As will be apparent in the following discussion, the absolute value of these numbers is preferably utilized so that if the signature line of s102 were drawn in an opposing direction system 10 will still obtain the same X-Y coordinate values repeated.

The next processing stage of compressor 24 is a data encoding operation s110. Data encoding operation s110 detects if the signs of the coordinate numbers have changed. If so, a "change sign" code is inserted into the coordinate data so that the number is replaced with the absolute value of itself. Then, data encoding operation s110 detects whether the number was repeated from the previous coordinate, whether a new signature stroke is starting, or whether the signature has been cancelled. A predetermined set of special codes are assigned to represent these situations. The special codes may be exchanged for numbers that are infrequently used so that the special codes, which are more frequently used, can be represented with fewer bits. If the number is not a special code, the number is forwarded.

Data encoding s110 may also add some special values to the stream of coordinate differences generated at s108. In one embodiment of the present invention the coordinate differences range from −505 to 505 as described above. Since 505 is not a power of 2 the next higher power of 2 is 512. Consequently, the numbers from 506 to 511 may be utilized to represent predetermined special values. When numbers need to be represented that are the same as the special value they are substituted with a "swap value" which is higher than 505.

In one embodiment of s110 data encoding is used to substitute predetermined codes in place of a coordinate tuple or coordinate element in order to represent special conditions more concisely to achieve higher compression. As non-limiting examples, the following special conditions may be identified:

Repeat-Element: The delta coordinate element is the same as the last one.
New-Stroke: This is the start of a new stroke within the signature.
Change-X-Sign: Change the sign (or direction) of the X delta coordinate elements.
Change-Y-Sign: Change the sign (or direction) of the Y delta coordinate elements.
Change-XY-Sign: Change the sign (or direction) of both the X and Y delta coordinate elements.
Cancel: Ignore all previous data for the signature.

The Repeat-Element may be used to repeat just one element of the coordinate, while all others may replace the entire coordinate.

The foregoing special conditions are preferably listed in order of frequency typically found in signatures such that the higher-frequency conditions on the list use the least number of bits, with descending conditions using more. With the exception of the Cancel code, the codes are preferably encoded using terminating codes only. This means that some of the terminating code values will be not be available as numeric values. When these values are needed, other codes that use makeup codes are substituted. The value of these codes are above the normal range of values (e.g., above 505) but lower than the maximum which can be encoded into keystrokes (527 under extended keyboard encoding). These codes include:

Repeat-Element-Swap
New-Stroke-Swap
Change-X-Sign-Swap
Change-Y-Sign-Swap
Change-XY-Sign-Swap It should be noted that most special values only occur when the X portion of a coordinate is expected. The REPEAT_HALF and REPEAT_HALF_SWAP values are exceptions. These may occur when either an X or a Y value is expected and take the place of that value.

The next processing stage of compressor 24 is compression at s112 of the encoded data of s110. In one embodiment of the present invention compression is performed using a modified form of Huffman compression encoding wherein the numbers of s110 are substituted with variable-length bit streams. More frequently used numbers are expressed with fewer bits than less frequently used numbers, thereby reducing the overall bit length of the encoded numbers. A sample set of data encoded signatures may be utilized to generate a modified Huffman table such that frequently-used values are assigned the shortest bit values. For example, values ranging from 0 to 63 are placed into the terminating code table. Values greater than 63 are assigned a makeup code and a terminating code. Makeup codes consist of values 64, 128, 192, etc. These are followed by a terminating code to encode the entire number as the sum of the makeup and terminating code. There must be enough makeup codes so that the maximum value plus 5 can be reached through a combination of the makeup code and terminating code. Standard Huffman techniques are used to generate the optimal table for the sample signature set. This table is then used for all future signature compression. Accordingly, the table may be hard-coded in system 10. The resulting output is a stream of bits on arbitrary boundaries.

Huffman encoding represents a set of values using a variable length bit stream. More frequently used values are represented by shorter bit streams and less frequently used ones by longer bit streams. Huffman values are typically numeric, but not necessarily so. However, modified Huffman encoding requires the values to be numeric because it represents all integer values of a set of number from 0 to n−1 and also all multiples of n to m. The values 0−n are known as terminating codes and the multiples of n are known as make-up codes. A terminating code can stand alone to represent a number 0−n, but when a make-up code is found a terminating code follows and the two are added together to form the value.

The Huffman table is preferably derived statistically. For example, a Huffman table may be derived by examining data generated from a statistically significant sample set of signatures.

The final processing stage of compressor 24 is a keyboard encoding operation s114 wherein the bit stream of s112 is organized into 9-bit groups such that each 9-bit number is broken down into two or three "keyboard codes" representing or emulating keys on a computer keyboard (i.e., key codes/scan codes). Keystrokes are used to encode the data on fixed-bit boundaries. The keyboard codes are stored to a buffer at s116 or sent directly to a host device 20 (FIG. 2).

The end of bit stream is padded, if needed, to form a 9-bit word. The padding must consist of a bit pattern that does not, by itself, represent a value in the Huffman table. In one embodiment padding is accomplished by shifting the remaining bits to the left and padding the right bits with "1s."

A check for completion of the signature input is performed at s118. If the signature is not complete, the process is continued. If the signature is complete, sensor panel 12A transmits at s120 a predetermined code as a terminator.

In one embodiment the aforementioned process continues until the user touches an <OK> or similar icon on sensor panel 12A with stylus 12D, thus causing the terminator code of s120 to be transmitted. The terminator code is provided to the scaling operation s106 and passed through operations s108 through s116 unmodified (i.e., without scaling, differencing, compressing, etc.) to signal that this is the end of the stream. Signature capture device 12 then returns to s102 and awaits another signature input.

With reference to FIG. 4, at s122 host device 20 polls sensor panel 12A for keyboard keystrokes, the sensor panel being configured to emulate a USB keyboard as detailed above. The set of keystrokes may be obtained directly from signature capture device 12 at s114, or may be obtained at s116 from a buffer (or buffers), which may be located at any or all of signature capture device 12, client 16, host 20, or any intermediate location.

At s124 host device 20 collects the keyboard-encoded set of keystrokes generated at s114 and converts the key codes into a stream of corresponding characters. This stream is then decompressed by host device 20, as detailed below.

At s126 a first processing stage of decompression converts the characters of s124 to sets of numbers by means of a predetermined lookup table. These numbers are combined to form a bit stream.

At s128 a second processing stage of decompression converts the variable length bit streams of s126 to predetermined individual numbers by using a fixed binary lookup tree. With each bit, the operation proceeds another level down the lookup tree until a leaf or terminal node is reached which contains the value. The next bit starts again at the top of the lookup tree.

At s130 a third processing stage of decompression is data decoding. This stage reverses the effect of the data encoding operation of s110. When complete, low numbers represent coordinate data, while a few predetermined high numbers are reserved for predetermined commands such as "change sign," "start of new stroke," and "cancel signature." Repeat codes are replaced with the actual coordinate data.

At s132 a fourth processing stage of decompression is absoluting. This operation adds all of the values together while respecting the number's sign. This operation reverses the differencing operation of s108.

At s134 the resulting coordinate stream, with embedded new stroke codes, is used to generate the decoded signature on a screen of host device 20 and/or to save the signature point data in an electronic database.

EXAMPLE

The following example is provided to illustrate in further detail the compression operation of system 10. Reference to FIGS. 1 through 4 should be made throughout.

At s104, the following X, Y coordinates are measured in relation to movement of stylus 12D upon sensor panel 12A:

TABLE 1

| Data Point | X | Y | OTHER |
|---|---|---|---|
| X1, Y1 | 5 | 6 | |
| X2, Y2 | 10 | 10 | |
| X3, Y3 | 12 | 59 | |
| X4, Y4 | 13 | 49 | |
| — | | | NEW STROKE |
| X5, Y5 | 14 | 59 | |
| X6, Y6 | 0 | 0 | |
| — | | | END |

For simplicity in this example the scaling operation s106 is essentially omitted from this example by dividing each X-Y coordinate by 1.

At s108 the differencing operation is performed by subtracting the previous coordinates, keeping in mind that a subtraction of 0,0 is performed for the initial data coordinates X1,Y1:

TABLE 2

| Data Point | X | Y | OTHER |
|---|---|---|---|
| X1, Y1 | 5 | 6 | |
| X2, Y2 | 5 | 4 | |
| X3, Y3 | 2 | 49 | |
| X4, Y4 | 1 | −10 | |
| — | | | NEW STROKE |
| X5, Y5 | 1 | 10 | |
| X6, Y6 | −14 | −59 | |
| — | | | END |

At s110 predetermined special codes are exchanged with certain X-Y coordinates:

TABLE 3

| Data Point | X | Y | CODE |
|---|---|---|---|
| X1, Y1 | 5 | 6 | |
| X2, Y2 | 49 | 4 | X = 49 represents a REPEAT_HALF special code due to the occurrence of two 5's in a row (X1, X2 of s108) |
| X3, Y3 | 2 62 | 510 | 49 is a predetermined special code for REPEAT_HALF, so it is swapped with Y = 510, which represents a REPEAT HALF SWAP code |
| X4, Y4 | 1 | 10 | |
| — | | | NEW STROKE |
| X5, Y5 | 62 | | REVERSE_Y_CODE (change Y's sign, now positive) |
| | 49 | 49 | REPEAT_HALF for both numbers (1, 10) |
| X6, Y6 | 63 | | REVERSE_X_AND_Y_CODE (change both X & Y's sign, now both negative) |
| | 14 | 59 | |

At s112 a modified version of Huffman encoding is utilized to convert the numeric values of s110 to a corresponding bit stream. A lookup table (not shown) has been generated to obtain the bit stream from the data points and special code.

TABLE 4

| Data Point | VALUE | BIT STREAM |
|---|---|---|
| X1 | 5 | 11010 |
| Y1 | 6 | 10110 |
| X2 | 49 | 01 |
| Y2 | 4 | 0000 |
| X3 | 2 | 1110 |
| Y3 | 510 = 448 + 62 | 1111000010010111011 |
| SPECIAL CODE | 62 | 11011 |
| X4 | 1 | 001 |
| Y4 | 10 | 101111 |
| SPECIAL CODE | 60 | 0001011 |
| SPECIAL CODE | 62 | 11011 |
| X5 | 49 | 01 |
| X5 | 49 | 01 |
| SPECIAL CODE | 63 | 1100100 |
| X6 | 14 | 1111110 |
| Y6 | 59 | 11001010000 |

The resulting variable-length bit stream is: 11010101100100001110111100001001011101110110011-01111000101111011010101110010011 1111011001010000.

At s114 the bit stream of s112 is converted to keyboard codes. First, the bit stream is broken into 9-bit number groups, read from left-to-right, and top-to-bottom as shown below:

| BIT GROUP | 110101011 | 001000011 | 101111000 | 010010111 | 011110110 | 011011110 |
|---|---|---|---|---|---|---|
| KEYBOARD CODE | 427 | 67 | 376 | 151 | 246 | 222 |

| BIT GROUP | 001011110 | 110101110 | 010011111 | 101100101 | 000011111 |
|---|---|---|---|---|---|
| KEYBOARD CODE | 94 | 430 | 159 | 357 | 31 |

If the bit stream does not end on a 9-bit boundary the remaining bits are padded by shifting the remaining bits to the left and filling the number group with 1's to complete a 9-bit number. In this example, the last four "0" bits are shifted left and the remaining five bits in the 9-bit number are filled with five 1's to complete the number group.

Then, the 9-bit numbers are converted to keyboard codes using a process similar to that described in the aforementioned U.S. patent application Ser. No. 13/771,843. In a variation of this process, the numbers are modified by including two Least Significant Digits (LSDs) in order to exceed a 505 (i.e., (21*23)+22) boundary. Table 5 below lists the 9-bit bit stream values for this example, the Most Significant Digit (MSD) and the LSD(s). The MSD comprises values in the range of 0 to 21 while the LSD comprises values in the range of 0 to 22. Thus, any number from 0 to 527 can be represented. The following equations may be used to determine the MSD and LSD of any number value "n":

$$MSD = \text{Integer}(n/23) \quad \text{Equation 7}$$

$$LSD = n \text{ modulo } 23 \quad \text{Equation 8}$$

For example, a value of 505 may be represented by MSD=21, LSD=22 (i.e., 21*23+22). As another example, a value of 527 may be represented by MSD=21, $LSD_1$=22, $LSD_2$=22 (i.e. 21*23+22+22).

TABLE 5

| Value | MSD | LSD1 | LSD2 |
|---|---|---|---|
| 67 | 2 | 21 | |
| 376 | 16 | 8 | |
| 151 | 6 | 13 | |
| 246 | 10 | 16 | |
| 222 | 9 | 15 | |
| 94 | 4 | 2 | |
| 430 | 18 | 16 | |
| 159 | 6 | 21 | |
| 357 | 15 | 12 | |
| 31 | 1 | 8 | |

These 21 numbers (i.e., MSD, LSD1 and LSD2) are sent as key codes in accordance with a predetermined lookup table and will appear as if typed on a keyboard. Each set (10 of them) comprising an MSD LSD1 and, optionally, LSD2, can be sent in a single USB packet. In addition, each set will alternate between upper and lower case. This is because a keyboard packet cannot contain mixed case. By alternating case it is possible to determine with certainty which MSB and LSDs are grouped together.

A suitable program on host computer 20 is configured to reverse the above-described process to convert the key codes back to a signature corresponding to the signature of s102. In most instances there will be significantly fewer keyboard codes in comparison to the process of the aforementioned U.S. patent application Ser. No. 13/771,843. The modified Huffman encoding/decoding process is lossless, resulting in an output that is unchanged from the input.

While this invention has been shown and described with respect to a detailed embodiment thereof, it will be understood by those skilled in the art that changes in form and detail thereof may be made without departing from the scope of the claims of the invention. For example, the invention is not limited to signatures and may be utilized to capture, convert, compress and communicate any suitable input signal in any form and from any suitable input device.

What is claimed is:
1. A remote data capture system, comprising:
a host computing device;
a client computing device communicatively coupled to the host computing device; and
a capture device coupled to the client computing device, the capture device having a sensor and controller that receives an electrical input signal from the sensor, converts the input signal to corresponding input data having a predetermined format;
compresses the input data to a variable-length bit stream; and
converts the variable-length bit stream to keyboard codes,
the client computing device selectably transmitting the keyboard codes to the host computing device, the client computing device and the host computing device being communicatively coupled by an electronic communication system.

2. The system of claim 1 wherein the sensor is a signature capture device having a sensor panel and a stylus, the sensor panel being configured to convert movement of the stylus upon the sensor panel into the electrical input signal.

3. The system of claim 2 wherein the sensor panel is at least one of a capacitive and a resistive sensor panel.

4. The system of claim 1 wherein the electronic communication system includes a network connection.

5. The system of claim 1 wherein the input data is compressed using a Huffman compression algorithm.

6. A system for compressing element signatures, comprising:
 a client having:
  a stylus;
  a sensor panel arranged to generate an electrical input signal in response to movement of the stylus thereupon;
  a client computing device, and
  a controller configured to receive the input signal from the sensor panel, convert the input signal to corresponding input data, compress the input data to a variable-length bit stream, convert the bit stream to keyboard codes, and forward the keyboard codes to the client computing device;
 a host computer configured to receive the keyboard codes from the client computer; and
 an electronic communication system intermediate the client computing device and the host computer and communicatively coupling the client computing device and the host computer.

7. The system of claim 6 wherein the input data is compressed with a Huffman compression arrangement.

8. The system of claim 6 wherein the host computer converts the forwarded keyboard codes into ASCII or Unicode characters.

9. A method for compressing electronic signatures using a remote data capture system, the data capture system comprising a host computing device, a client computing device and a capture device operatively coupled to the client computing device, the method comprising the steps of:
 the client computing device, using the capture device, generating an electrical input signal in response to movement of a stylus upon a sensor panel of the capture device;
 the client computing device, using the capture device, measuring coordinates corresponding to the electrical input signal;
 the client computing device, using the capture device, scaling the coordinates;
 the client computing device, using the capture device, differencing the scaled coordinates;
 using the client computing device, encoding the differenced coordinates with special codes to generate coded data;
 using the client computing device, compressing the coded data with a Huffman compression algorithm, and a Huffman table tuned for handwritten signatures, the compressed data having a variable length bit stream; and
 using the client computing device, encoding the compressed data into a format emulating keyboard scan codes; and
 communicatively transmitting the keyboard scan codes from the client computing device to the host computing device with a USB communication system, wherein the host computing device uses the keyboard scan codes directly, or translates the keyboard scan codes into ASCII or Unicode characters depending on the capability of the host computing device's web browser or other application.

10. The method of claim 9 wherein the electronic communication system includes a network connection.

11. The method of claim 9, further including the step of configuring the host computing device to:
 receive the formatted data;
 convert the formatted data to predetermined characters;
 converting the characters to a bit stream;
 converting the bit stream to number data;
 decoding the number data;
 absoluting the data; and
 rendering a signature.

12. The method of claim 9 wherein the encoding step includes special codes for encoding predetermined differenced coordinates.

* * * * *